INVENTOR:
FREDERICK L. BROWN

ATTORNEYS:
Plumley, Tyner, & Sandt

United States Patent Office 3,704,200
Patented Nov. 28, 1972

3,704,200
CONDENSATION RESINS FROM ALDEHYDES, POLYNUCLEAR CATECHOL AND RESORCINOL
Frederick L. Brown, Midland, Mich., assignor to The Dow Chemical Company, Midland, Mich.
Continuation-in-part of application Ser. No. 739,754, June 25, 1968. This application May 19, 1970, Ser. No. 36,692
Int. Cl. C08g 5/10
U.S. Cl. 161—262
12 Claims

ABSTRACT OF THE DISCLOSURE

Resins which are the reaction product of an aldehyde and
(A) at least one polyhydric, polynuclear compound of the formula:

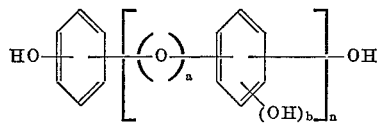

Figure 1:
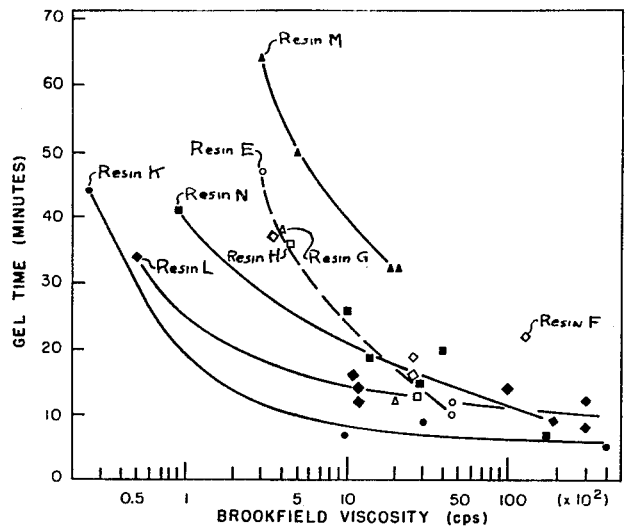

wherein $a$ is 0 or 1, $b$ is 0 or 1, $a+b$ equals 1, and $n$ is an integer from 1 to 4, inclusive; and
(B) 10 to 80 weight percent, based on the combined weight of A and B, of catechol and resorcinol wherein the weight ratio of catechol to resorcinol is 25:100 to 85:100, are disclosed.

These resins are admixed with aldehyde-containing hardeners, resins of catechol-resorcinol mixtures below the stated ratio, resins of catechol alone, or resins of resorcinol to prepare resins which cure in a short time and which are useful as adhesives such as in the manufacture of plywood. The resins exhibit fast cure and good shelf-life.

CROSS-REFERENCE TO RELATED APPLICATIONS

This application is a continuation-in-part of patent application, Ser. No. 739,754, filed June 25, 1968, now abandoned.

DISCLOSURE

Earlier applications in which the invention herein was a co-inventor (Ser. No. 510,041, filed Nov. 26, 1965, and Ser. No. 367,209, filed May 13, 1964) describe resins which are the reaction product of an aldehyde; at least one polyhydric, polynuclear compound of Formula I:

(I)
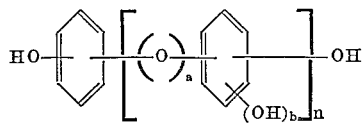

wherein $a$ is 0 or 1, $b$ is 0 or 1, $a+b$ equals 1, and $n$ is an integer from 1 to 4 inclusive, and preferably 1 to 2; and 0 to 80% of a mixture of catechol, resorcinol and hydroquinone as mononuclear ingredients. These resins form curable adhesives when mixed with a hardener containing a source of additional aldehyde.

It has now been discovered that, if these resins contain 10 to 80, and preferably 50 to 70, weight percent of catechol and resorcinol (wherein the weight ratio of catechol to resorcinol is 25:100 to 85:100, and preferably 35:100 to 70:100), essentially as the sole mono-nuclear ingredients, several beneficial results occur. First, the resins cure in appreciably-shorter time than corresponding resins below the preferred ratio or resins containing either catechol or resorcinol as the sole mono-nuclear ingredient. Second, the resins, at the same time, exhibit excellent shelf-life compared to corresponding resins containing hydroquinone as an additional mono-nuclear component.

The use of catechol to resorcinol ratios above 85:100 is possible but these resins cure so rapidly that their use as an adhesive is impractical. This is surprising since the curing rate is very slow at a catechol to resorcinol ratio of infinity, i.e. 100% catechol. This rapid curing effect is most pronounced when the resin contains 50 to 70 weight percent of the catechol-resorcinol mixture.

The rapid curing of the resins of the present invention is evidenced by reduced gel times. The ultimate test is rate of cure to a satisfactory bond under actual use conditions.

The underlying reasons for the rapid curing effect coupled with good shelf-life are not fully understood but are believed to be related to differences in the route of molecular weight increase of the reaction product of the resin components which can be demonstrated by gel permeation chromatographic data.

Although one, or a mixture, of the compounds of Formula I can be employed, in a preferred embodiment of the present invention the polyhydric, polynuclear compounds of Formula I preferably comprise a dinuclear compound of Formula II:

(II)
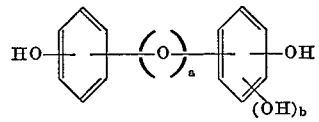

wherein $a$ is 0 or 1, $b$ is 0 or 1, and $a+b$ equals 1; and a trinuclear compound of Formula III:

(III)
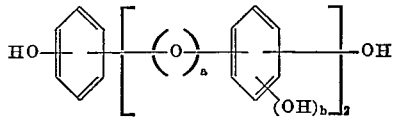

wherein $a$ and $b$ have the same meanings as in Formula II.

The compound of Formulae II and III can be present in widely varying weight ratios, but are preferably present in a weight ratio of 19:10 to 33:10.

Examples of suitable dinuclear compounds of Formula II include 4,4'-dihydroxydiphenyl oxide, 2,4'-dihydroxydiphenyl oxide, 2,3,3'-trihydroxybiphenyl, and 2,4,4'-trihydroxybiphenyl, as well as mixtures of various isomers thereof. Examples of suitable trinuclear compounds of Formula III are those of the following Formulae IV through X, as well as position isomers and mixtures of two or more thereof:

(IV) 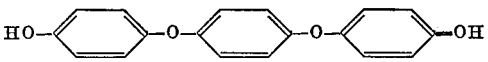

(V) 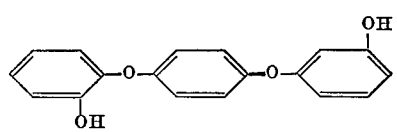

(VI) 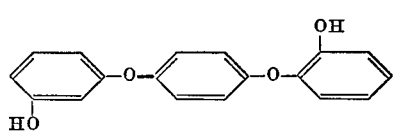

(VII) 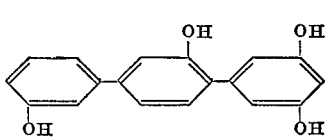

(VIII) 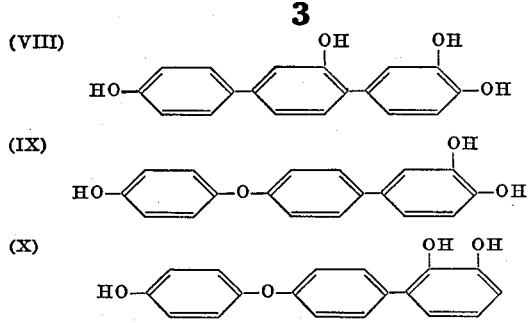

(IX)

(X)

These compounds can be synthesized as described in abandoned U.S. application, Ser. No. 367,194, filed May 13, 1964.

The resins of the present invention can be synthesized by mixing the aldehyde, and the polyhydric, polynuclear compound or compounds of Formula I with the catechol and resorcinol at any suitable temperature above which the reaction mixture solidifies and below which one reactant thermally degrades, and generally from 0 to 100° C., and preferably at ambient temperatures, for periods of time of from a few minutes up to several months. Immediately upon mixing, the viscosity of the reaction mixture begins to increase and, depending upon the proportions of the reactants, will generally reach an ultimate viscosity within three days to six months. The reaction can be conducted at widely varying pH values, employing acidic or basic catalysts, but is preferably conducted at autogenous pH in the absence of a catalyst.

In order to form an adhesive, the resins of the present invention are admixed with a hardener which comprises an aldehyde or aldehyde source and can optionally contain one or more fillers such as sawdust, white pine wood flour, and walnut shell flour. The pH of the hardener is preferably increased to above 7 by the addition of an alkaline material such as sodium hydroxide. Such adhesives can be employed for a wide variety of purposes and are especially suitable for the bonding of ligno-cellulosic and cellulosic adherends such as encountered in the formation of plywood.

The aldehydes which can be employed in the present invention as either a coreactant for the reaction mixture of polynuclear compound of Formula I, resorcinol, and catechol, or as an essential ingredient of the hardener, are preferably the lower aliphatic monoaldehydes such as propionaldehyde, acetaldehyde, furfural aldehyde, or, most preferably, formaldehyde. The formaldehyde can be used in any suitable form such as paraformaldehyde or "formalin," the widely used aqueous solution containing approximately 37 weight percent HCHO. The aldehyde is coreacted in ratios of 0.4 to 0.7 mole aldehyde per total moles of catechol, resorcinol, dinuclear compound, and trinuclear compound.

The hardener is admixed with the resin in an amount sufficient to cure the resin and generally from 3 to 20 weight percent additional aldehyde based on resin solids.

The invention is further illustrated by the following examples in which all parts and percentages are by weight unless otherwise indicated. These non-limiting examples are illustrative of certain embodiments designed to teach those skilled in the art how to practice the invention and to represent the best mode presently known for carrying out the invention.

Example 1

This example illustrates the synthesis of resins of the present invention, as well as certain control resins.

The resins having the designations in Column 1 of Table I are each prepared by mixing the indicated quantities of the ingredients in Columns 2 through 6 at room temperature to form a homogenous mixture. To this mixture is then added, with mixing, the quantity of formalin in Column 7. The formalin employed is an aqueous solution containing approximately 37 weight percent HCHO. Although the weight of formalin in Column 7 varies, the ratio of moles of HCHO to moles of reactants in Columns 2 through 5, inclusive, is held constant at 0.633:1.

The dinuclear component listed in Column 4 of Table I is a mixture of 45 weight percent of mixed isomers of Formula XI:

(XI) 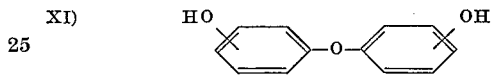

and 55 weight percent of mixed isomers of Formula XII:

(XII) 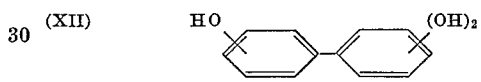

The trinuclear component listed in Column 5 of Table I is a mixture of isomers of Formulae XIII through XV:

(XIII) 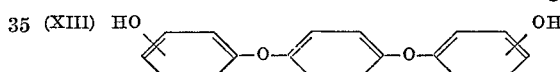

(XIV) 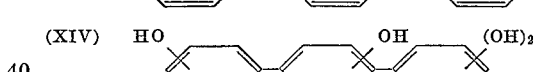

(XV) 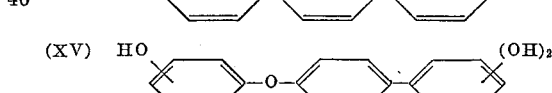

prepared by the caustic hydrolysis of chlorophenol in accordance with abandoned U.S. application, Ser. No. 367,194, filed May 13, 1964, entitled "Polyhydroxy Aromatic Composition of Matter and Process for Preparing the Same."

TABLE I

| 1 | 2 | 3 | 4 | 5 | 6 | 7 |
|---|---|---|---|---|---|---|
| Resin (desig.) | Catechol (grams) | Resorcinol (grams) | Dinuclear component (grams) | Trinuclear component (grams) | Water (grams) | Formalin (grams) |
| A | 680 | 0 | 230 | 90 | 287 | 392 |
| B | 650 | 0 | 250 | 100 | 287 | 384 |
| C | 620 | 0 | 270 | 110 | 287 | 379 |
| D | 590 | 0 | 290 | 120 | 287 | 370 |
| E | 0 | 680 | 230 | 90 | 287 | 392 |
| F | 0 | 650 | 250 | 100 | 287 | 384 |
| G | 0 | 620 | 270 | 110 | 287 | 379 |
| H | 0 | 590 | 290 | 120 | 287 | 370 |
| J | 0 | 550 | 320 | 130 | 293 | 361 |
| K | 280 | 400 | 230 | 90 | 286 | 392 |
| L | 210 | 440 | 250 | 100 | 286 | 384 |
| M | 140 | 480 | 270 | 110 | 236 | 379 |
| N | 70 | 520 | 290 | 120 | 286 | 370 |

Example 2

This example illustrates the reduced gel times of the resins of the present invention compared to certain control resins.

At varying time intervals, 154 g. aliquots of the resins shown in Column 2 of Table II having the amount of catechol and/or resorcinol shown in Columns 3 and 4 and having the viscosity shown in Column 5, are drawn from larger samples of the resins previously prepared as described in Example 1. These 154 g. aliquots are admixed with a liquid hardener (80.2 g.) formulated as described below, placed in a controlled temperature bath at 30° C., and subjected to a TECAM® gel time determination with the results recorded in Column 6 of Table II. The gel time is determined as described in the booklet entitled "TECAM Gelation Timer," published by Techne (Cambridge) Ltd., Duxford, Cambridge, England. The data for runs 8 through 42, inclusive, are shown in FIG. 1. The gel times for runs 1 through 7 are too great to be shown on FIG. 1 because of the time scale employed.

As is apparent by reference to Table II and FIG. 1, at any given viscosity the gel times of adhesives made with resins having the preferred catechol to resorcinol ratio are much less than the gel times of adhesives made with resins containing catechol as the only mononuclear ingredient. FIG. 1 indicates that up to viscosities of 3000 centipoises the gel times of adhesives made with resins having the preferred catechol to resorcinol ratio are less than the gel times of adhesives made with a resin containing either a catechol to resorcinol ratio below the preferred range or resorcinol alone as the mononuclear ingredient.

The liquid hardener employed in this example is prepared by thoroughly mixing the following quantities of the following ingredients:

| Ingredient: | Quantity (parts) |
|---|---|
| Sodium hydroxide solution (5% NaOH in water) | 32.9 |
| Paraformaldehyde | 8.7 |
| Walnut shell flour (Perkin's Glue Co. X-1 Grade) | 11.1 |

TABLE II

| 1 | 2 | 3 | 4 | 5 | 6 |
|---|---|---|---|---|---|
| Adhesive formulation (No.) | Resin from Table I (desig.) | Catechol (wt. percent) | Resorcinol (wt. percent) | Brookfield viscosity (cps.) | Gel time (min.) |
| 1 | A | 68 | 0 | 104 | 5,700+ |
| 2 | B | 65 | 0 | 220 | 5,700+ |
| 3 | B | 65 | 0 | 2,000 | 1,627 |
| 4 | C | 62 | 0 | 240 | 4,547 |
| 5 | C | 62 | 0 | 7,200 | 915 |
| 6 | D | 59 | 0 | 3,800 | 1,153 |
| 7 | D | 59 | 0 | 3,800 | 1,375 |
| 8 | E | 0 | 68 | 300 | 47 |
| 9 | E | 0 | 68 | 4,500 | 10 |
| 10 | E | 0 | 68 | 4,500 | 12 |
| 11 | F | 0 | 65 | 350 | 37 |
| 12 | F | 0 | 65 | 2,600 | 19 |
| 13 | F | 0 | 65 | 2,600 | 16 |
| 14 | F | 0 | 65 | 12,800 | 22 |
| 15 | G | 0 | 62 | 400 | 38 |
| 16 | G | 0 | 62 | 2,000 | 12 |
| 17 | H | 0 | 59 | 450 | 36 |
| 18 | H | 0 | 59 | 2,700 | 13 |
| 19 | K | 28 | 40 | 25 | 44 |
| 20 | K | 28 | 40 | 1,000 | 7 |
| 21 | K | 28 | 40 | 3,000 | 9 |
| 22 | K | 28 | 40 | 39,600 | 5 |
| 23 | L | 21 | 44 | 50 | 34 |
| 24 | L | 21 | 44 | 1,100 | 16 |
| 25 | L | 21 | 44 | 1,200 | 14 |
| 26 | L | 21 | 44 | 1,200 | 12 |
| 27 | L | 21 | 44 | 2,500 | 14 |
| 28 | L | 21 | 44 | 10,200 | 14 |
| 29 | L | 21 | 44 | 18,800 | 9 |
| 30 | L | 21 | 44 | 30,400 | 12 |
| 31 | L | 21 | 44 | 30,400 | 8 |
| 32 | M | 14 | 48 | 45 | 115 |
| 33 | M | 14 | 48 | 300 | 64 |
| 34 | M | 14 | 48 | 500 | 50 |
| 35 | M | 14 | 48 | 1,900 | 32 |
| 36 | M | 14 | 48 | 2,100 | 32 |
| 37 | N | 7 | 52 | 90 | 41 |
| 38 | N | 7 | 52 | 1,000 | 26 |
| 39 | N | 7 | 52 | 1,400 | 19 |
| 40 | N | 7 | 52 | 2,800 | 15 |
| 41 | N | 7 | 52 | 3,000 | 18 |
| 42 | N | 7 | 52 | 17,600 | 7 |

Example 3

This example illustrates the short curing times which are possible with the resins of the present invention compared to certain control resins in the formation of plywood.

The adhesive formulation of Example 2 was used to determine hot press cure requirements of several of the resins of Example 1. The procedure simulated commercial hot press plywood manufacturing processes and involved the preparation of 3-ply, 6" x 6" x 3/8" Douglas fir panels pressed two panels per press opening at 200 p.s.i. using a platen temperature of 148° C. (298° F.) Actual glue-line temperature of the innermost glue line was sensed with a thermocouple placed in the glue line and recorded in a time-temperature plot. Panels were cooled to room temperature immediately on removal from the press. The panels were subjected to cyclic-boil tests and vacuum-pressure tests as described in Section 4.4, Product Standard PS 1–66 for construction and industrial plywood, U.S. Department of Commerce.

Figure 2:
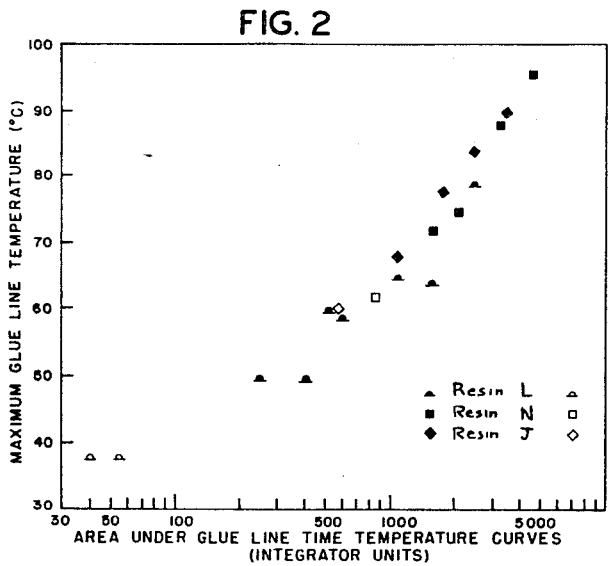
Figure 3:
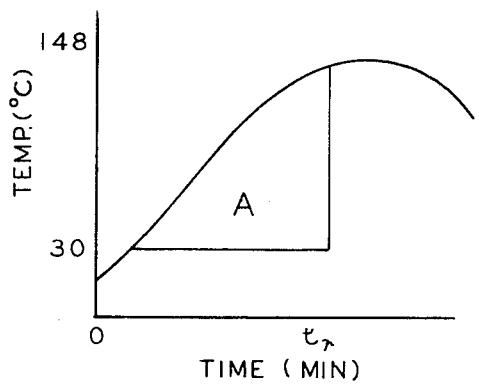

The maximum glue-line temperature and the area under the glue-line time-temperature plot (see FIG. 2) was used to characterize the hot press cure requirements as shown in FIG. 3, wherein a solid point indicates a specimen which passes both tests and an open point indicates a sample which fails either test.

In this example, satisfactory bonds that pass the cyclic-boil and vacuum-pressure tests are obtained at press times of as little as 1½ minutes with Resin L, whereas Resin N requires at least 3 minutes under the same conditions. Resin J, the fastest curing resin of those containing resorcinol as the only mononuclear ingredient, does not compare in speed of cure with Resin L, having a catechol to resorcinol ratio within the preferred range.

Example 4

This example illustrates the shelf-life of the resins of this invention and compares them to corresponding resins containing an additional mononuclear component (hydroquinone) as disclosed in Example 2 of Canadian Pat. 771,746 issued Nov. 14, 1967 and Netherlands application 6,506,110, Nov. 15, 1965.

The mononuclear component used in 4–A and 4–C corresponds to mono-nuclear component described in Example 2 of the above-identified Canadian patent as "ca. 13% ortho, ca. 84% meta and para."

Resins 4–A, 4–B, 4–C and 4–D were prepared as described below. The resins were stored and viscosity measurements were taken periodically as indicated.

Resin 4–A.—A mixture of 425.0 g. of mixed dihydroxybenzenes (301.5 g. resorcinol, 61.2 g. pyrocatechol, 62.3 g. hydroquinone), 143.2 g. of mixed isomers of dihydroxydiphenyl ether and trihydroxybiphenyl, 95.5 g. mixed isomers of polyhydric trinuclear aromatic compounds of Formula III as defined on page 3, and 177.5 g. of water was stirred and heated to 60° C. to make a homogeneous solution. The solution was cooled to 25° C. and 269.7 g. of 35.1% aqueous formaldehyde was added. The resulting mixture was heated and stirred at 49–53° C. for about three hours to obtain a viscous homogeneous liquid resin.

Resin 4–B.—The preparation of Resin A was repeated except for using a mixture of 340 g. resorcinol and 85 g. pyrocatechol as the dihydroxybenzene component. The reaction solution was heated and stirred at 45–57° C. for about three hours, then allowed to stand at 22–24° C.

Resin 4–C.—The preparation of Resin 4–A was repeated except for using half the specified quantities of materials and reacting the aqueous formaldehyde with the phenolic solution at 25° C. for 30 minutes, then the resin was bottled and allowed to stand at ambient temperature.

Resin 4–D.—The preparation of Resin 4–B was repeated except for using half the specified quantities of materials and reacting the aqueous formaldehyde with the phenolic solution at 25° C. for 30 minutes, then the resin was bottled and allowed to stand as above.

The resins prepared above were stored at 22–24° C. and periodic measurements of viscosity at room temperature were made using a rotating spindle type of viscosimeter. The results are tabulated in Table III.

TABLE III.—VISCOSITY MEASUREMENTS

Resin 4–A

| Time, days: | Viscosity, cps. |
|---|---|
| 1.33 | 300 |
| 7 | 1,960 |
| 10 | 6,050 |
| 13 | 13,300 |
| 20[a] | 16,140 |
| 24.5 | 28,940 |
| 29.5 | 35,900 |
| 31.5 | 45,700 |
| 34.5 | 56,200 |
| 36.5 | 63,900 |
| 38.5 | 54,600 |
| 41.5 | 64,000 |
| 56.5 | 83,500 |
| 65.5 | 71,600 |
| 86 | 72,400 |
| 125 | 108,600 |
| 157 | 157,700 |

[a] Stored at 0° C. at 13–20 days.

Resin 4–B

| Time, days: | Viscosity, cps. |
|---|---|
| 1 | 4,665 |
| 1.8 | 11,990 |
| 3.8 | 17,400 |
| 7 | 28,500 |
| 14[b] | 25,630 |
| 18.5 | 37,800 |
| 23.5 | 37,400 |
| 25.5 | 41,600 |
| 28.5 | 47,500 |
| 30.5 | 50,500 |
| 32.5 | 39,700 |
| 35.5 | 49,300 |
| 50.5 | 50,300 |
| 59.5 | 47,000 |
| 80 | 43,300 |
| 119 | 60,900 |
| 151 | 89,200 |

[b] Stored at 0° C. at 7–14 days.

Resin 4–C

| Time, days: | Viscosity, cps. |
|---|---|
| 1 | 153 |
| 1.3 | 370 |
| 3.0 | 31,100 |
| 3.3 | 54,800 |
| 6.0[c] | 3,688,000 |

[c] Essentially a gel.

Resin 4–D

| Time, days: | Viscosity, cps. |
|---|---|
| 1 | 91 |
| 1.3 | 170 |
| 3.0 | 3,555 |
| 6.0 | 19,100 |
| 8 | 32,600 |
| 10 | 30,700 |
| 13 | 38,900 |
| 28 | 47,400 |
| 37 | 45,300 |
| 58 | 38,000 |
| 129 | 70,800 |

Although the invention has been described in considerable detail with reference to certain preferred embodiments thereof, it will be understood that variations and modifications can be effected within the spirit and scope of the invention as described above and as defined in the appended claims.

What is claimed is:

1. A resin which is the reaction product of an aldehyde and
   (A) at least one polyhydric polynuclear compound of the formula $$HO-\left[\underset{}{\bigcirc}-(O)_a-\underset{(OH)_b}{\bigcirc}\right]_n-OH$$

wherein $a$ is 0 or 1, $b$ is 0 or 1, $a+b$ equals 1, and $n$ is an integer from 1 to 4 inclusive; and
   (B) from 10 to 80 weight percent, based on the combined weight of A and B of polyhydric phenols consisting essentially of catechol and resorcinol wherein the weight ratio of catechol to resorcinol is 25:100 to 85:100.

2. The resin of claim 1 wherein the catechol to resorcinol ratio is 35:100 to 70:100.

3. The resin of claim 1 wherein B comprises 50 to 70 weight percent based on the combined weight of A and B.

4. The resin of claim 1 produced at autogenous pH.

5. The resin of claim 1 produced at ambient temperature.

6. The resin of claim 1 produced at ambient temperature and autogenous pH.

7. A resin which is the reaction product of an aldehyde and
   (A) a polyhydric, dinuclear compound of the formula $$HO-\underset{}{\bigcirc}-(O)_a-\underset{(OH)_b}{\bigcirc}-OH$$

wherein $a$ is 0 or 1, $b$ is 0 or 1, and $a+b$ equals 1; and
   (B) a polyhydric, trinuclear compounds of the formula $$HO-\left[\underset{}{\bigcirc}-(O)_a-\underset{(OH)_b}{\bigcirc}\right]_2-OH$$

wherein $a$ is 0 or 1, $b$ is 0 or 1, and $a+b$ equal 1; and
   (C) from 10 to 80 weight percent based on the combined weight of A, B, and C, of polyhydric phenols consisting essentially of catechol and resorcinol wherein the weight ratio of catechol to resorcinol is 25:100 to 85:100.

8. The resin of claim 7 wherein the catechol to resorcinol is 35:100 to 70:100.

9. The resin of claim 7 wherein the weight ratio of A:B is 19:10 to 33:10.

10. The resin of claim 7 wherein the aldehyde is formaldehyde.

11. A laminate selected from the group consisting of ligno-cellulosic and cellulosic adherends bonded with the resin of claim 1.

12. The resin of claim 1 produced at a temperature of 25°–57° C.

References Cited

FOREIGN PATENTS 771,746  11/1967  Canada.
1,075,138  7/1967  Great Britain.

HOWARD E. SCHAIN, Primary Examiner

U.S. Cl. X.R.

161—259; 260—17.25, 29.3, 37 R, 54, 52